F. W. WOOD.
INDICATING SYSTEM FOR TURRETS.
APPLICATION FILED AUG. 8, 1910.
1,094,689.
Patented Apr. 28, 1914.
6 SHEETS—SHEET 4.
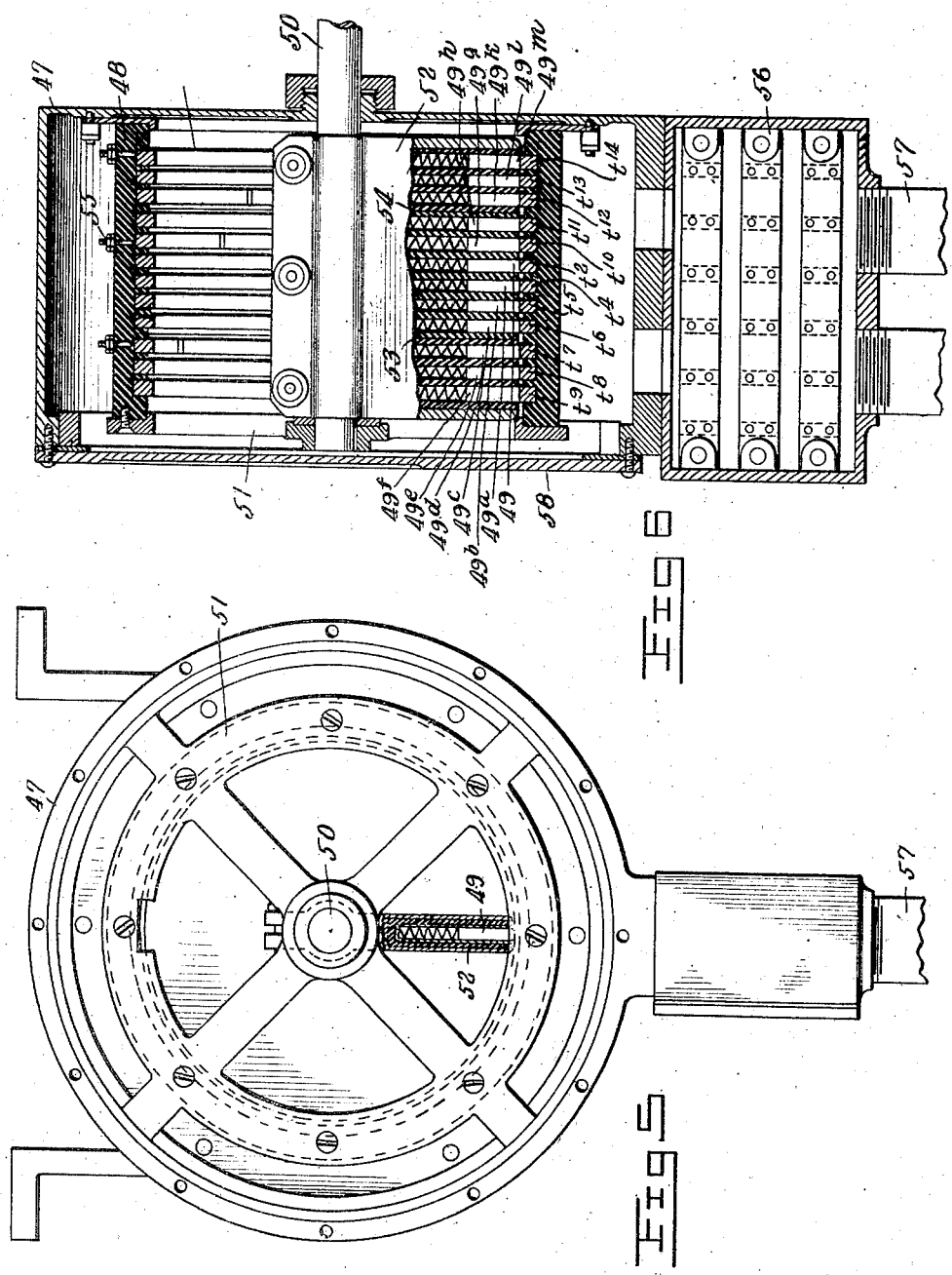
Witnesses
H. G. Rohnett
C. H. Fesler
Inventor
Frank W. Wood
By Lupus Cushman and Rea
Attorney F. W. WOOD.
INDICATING SYSTEM FOR TURRETS.
APPLICATION FILED AUG. 8, 1910.
1,094,689.
Patented Apr. 28, 1914.
6 SHEETS—SHEET 5.
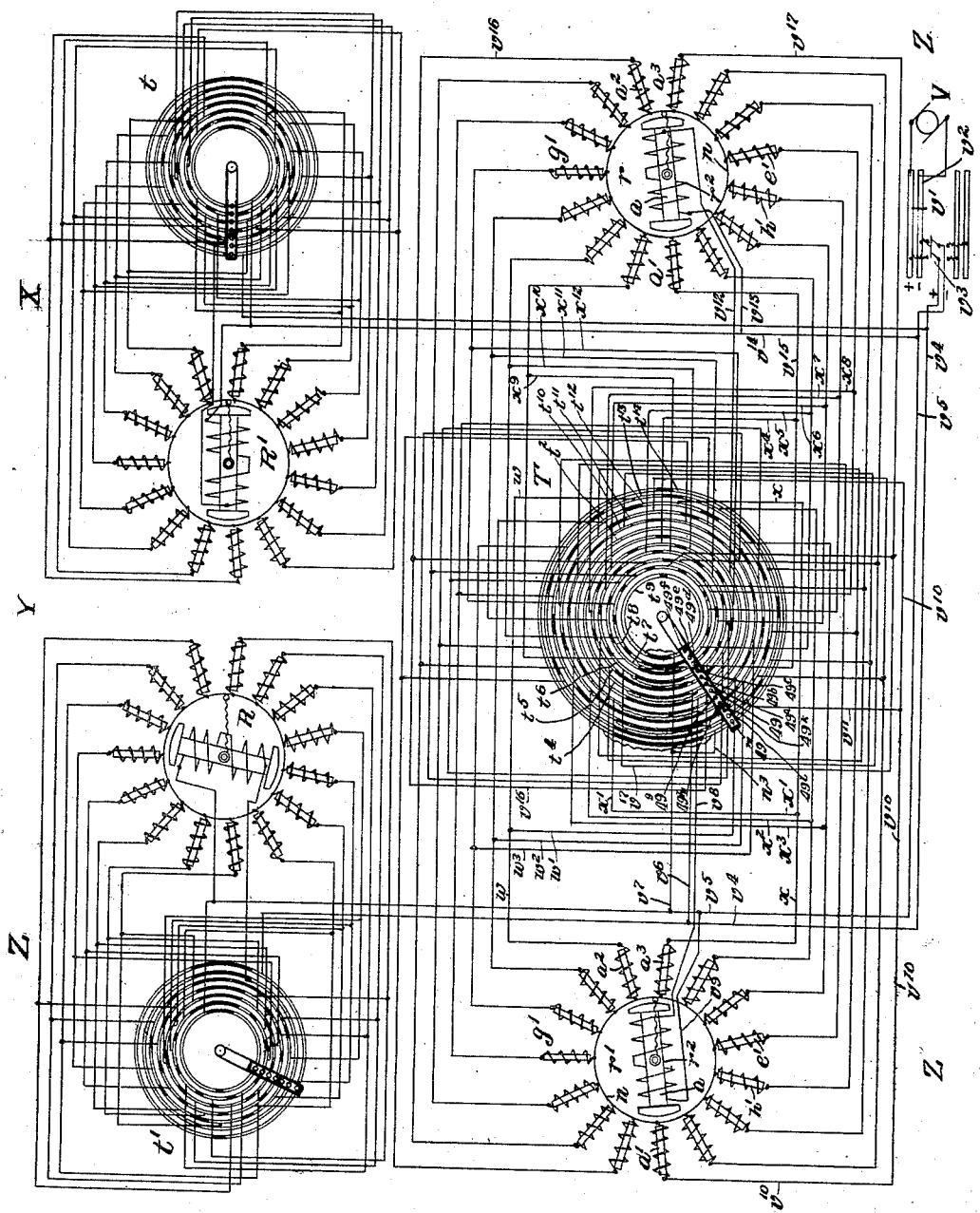
Witnesses
H. A. Robinette
A. P. Hollingsworth
Inventor
Frank W. Wood
By Luspus Cushman & Co.
Attorney

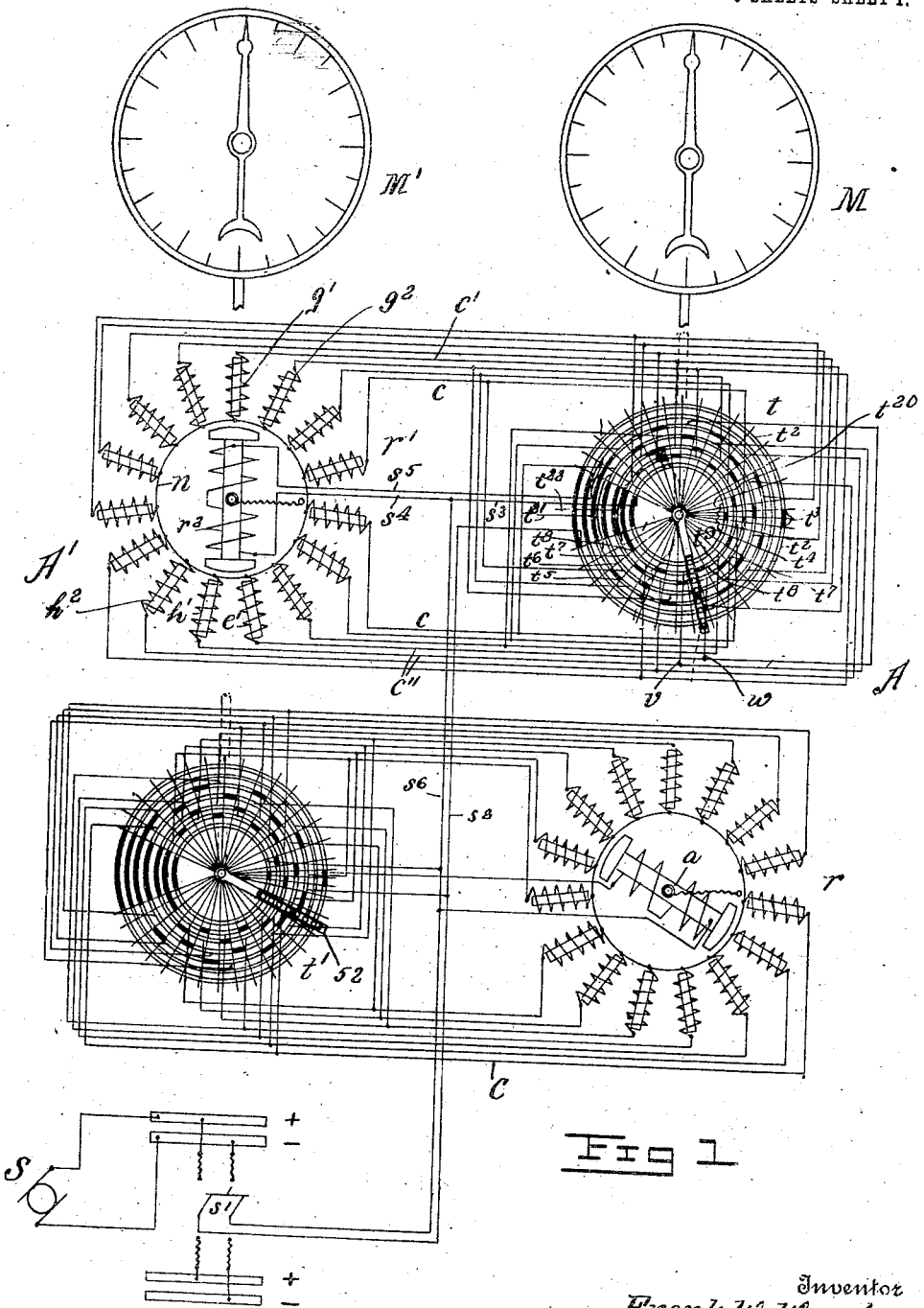

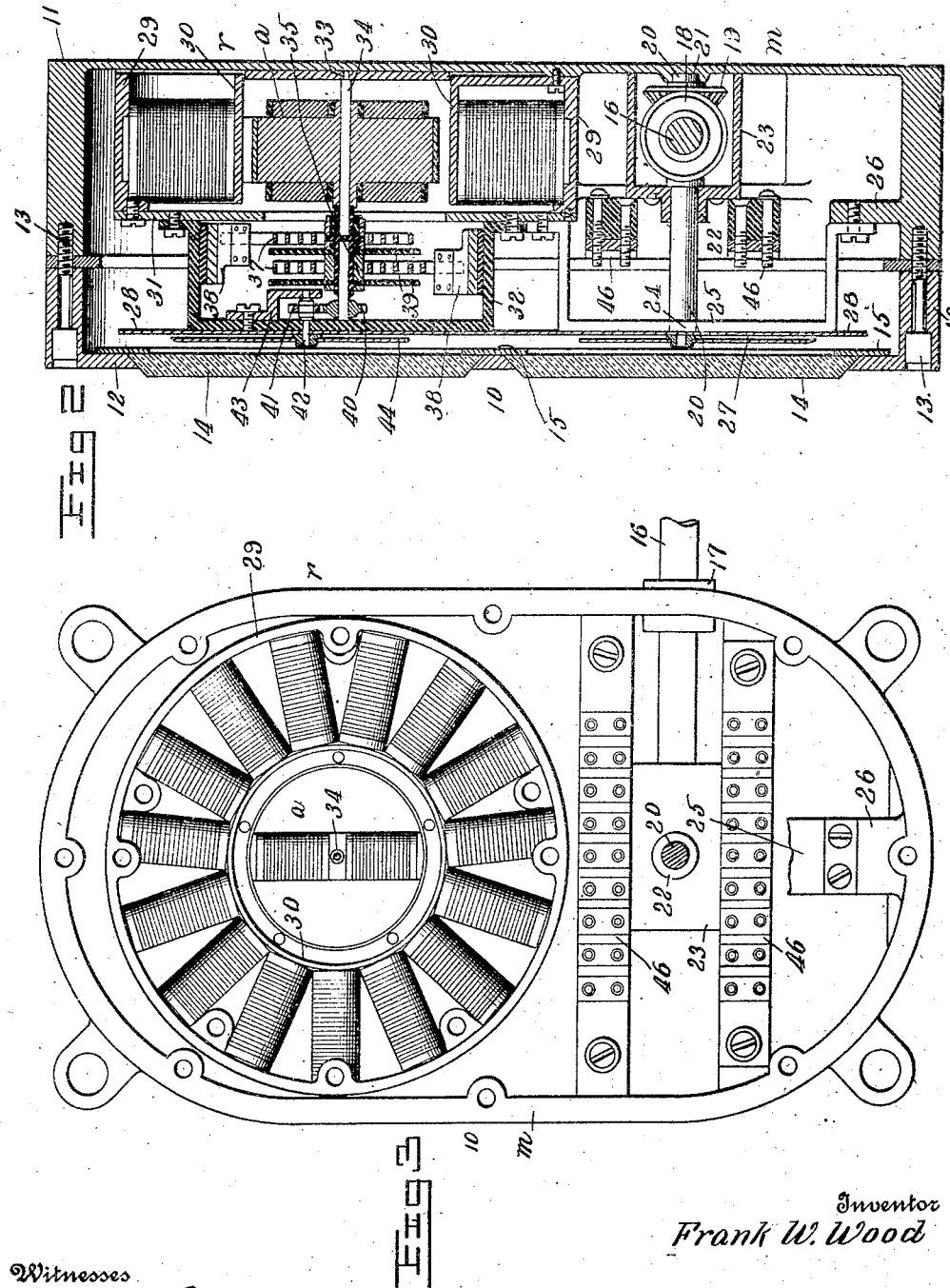

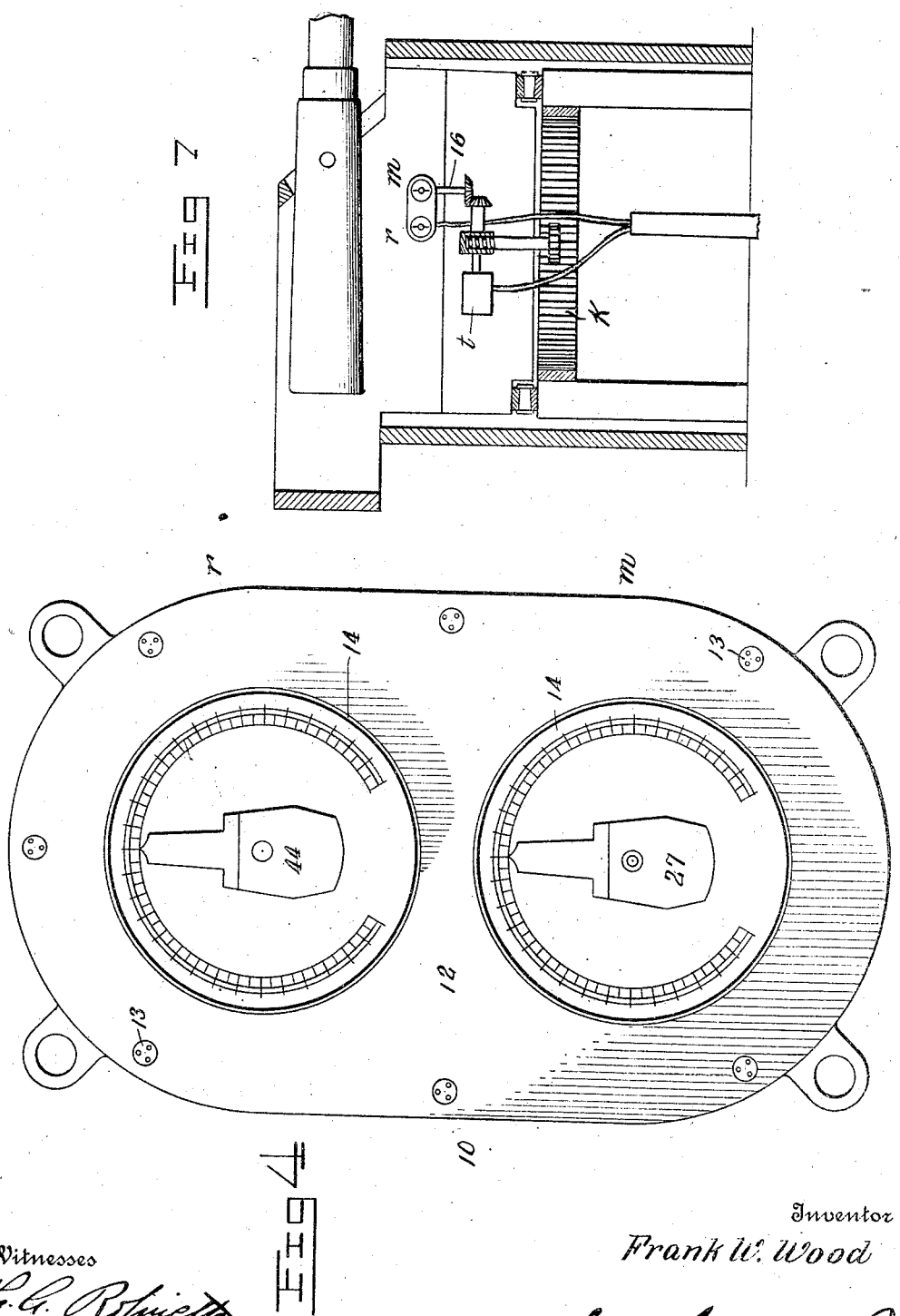

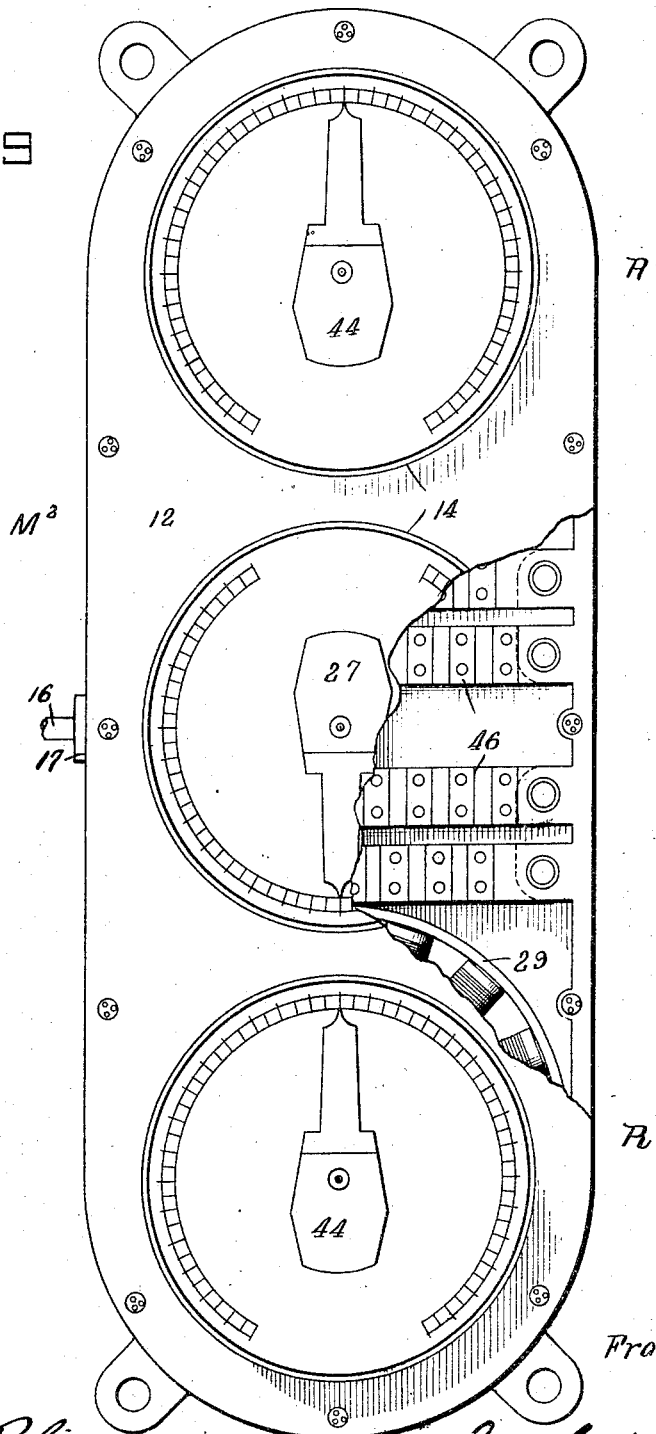

UNITED STATES PATENT OFFICE.

FRANK W. WOOD, OF NEW YORK, N. Y., ASSIGNOR, BY MESNE ASSIGNMENTS, TO CHARLES CORY & SON, INC., OF NEW YORK, N. Y., A CORPORATION OF NEW YORK.

INDICATING SYSTEM FOR TURRETS.

1,094,689.　　　　Specification of Letters Patent.　　Patented Apr. 28, 1914.

Application filed August 8, 1910. Serial No. 576,257.

*To all whom it may concern:*

Be it known that I, FRANK W. WOOD, a citizen of the United States, residing at New York, in the county of New York and State of New York, have invented new and useful Improvements in Indicating Systems for Turrets, of which the following is a specification.

My invention consists of a position indicating system for turrets and has particular relation to a system in which angular position of two or more adjacent turrets is told in each turret. While having the definite relation and adaptation stated, however, my invention is capable of use in connection with other systems in whole or in part, and also in other situations.

In operating battle ships, it is very desirable that the guns of the turrets be not trained angularly toward each other within certain limits. Damage frequently results when this precaution is not observed and may be due either to shock of the firing or to a shot from one gun striking the muzzle of another, in an adjacent turret. The guns in each turret being angularly movable with the turrets themselves, there are many angular positions in which each gun may be aimed, outside of the danger zone of guns in an adjacent turret, if the gunner has accurate knowledge of the angular positions of the guns last mentioned. When a gun in one turret is in a certain angular position, a gun in an adjacent turret can be trained to a position which it should not usually occupy, or in which it ordinarily could not fire, if the first gun was in a position angularly nearer toward it. The operating range, therefore, of the guns in each turret is to some extent directly dependent upon the position in which guns in the other turret are aimed.

Systems have heretofore been designed to facilitate the aiming of the guns in adjacent turrets without danger. Some of thes systems, with which I am acquainted, give a warning signal when the danger zone, either horizontally or vertically, is reached by one gun as respects another in an adjacent turret. According to my invention I provide means whereby an actual indication of the angular position of one turret with respect to another turret next adjacent is given, at all times while the turrets are being operated. If due heed is given to these indications, the guns of adjacent turrets may be operated without being aimed into danger zones of each other, and the danger above mentioned is thus avoided. Moreover, in my system, as the operators in each turret have at all times accurate information as to the extent of the firing range of their guns, the latter may be trained definitely and at once to certain desired positions, and time lost by the old warning signal system saved. That these features are most important and most advantageous to a ship in action will be readily apparent. My purpose is to incorporate these features in a simple system, which is inexpensive to install and at the same time reliable, efficient and durable under the most severe conditions of service.

In the accomplishment of my invention I make use of one or more receivers in each turret, each receiver serving as a position indicator for disclosing the position of a turret other than that in which it is located, and a transmitter in each turret operated by the rotary movement thereof, to an extent proportionate to such movement. Connections from the transmitters to the receivers, cause indications of positions of each adjacent turret to be given by the receiver or receivers in the others. These indications are supplemented by indications in each turret as to its own position. I make use of combined indicating instruments, the indicating dials or fields being so disposed with respect to each other that the relative angular position of the turrets can be seen at a glance. Further I form the pointers of a shape related to that of the turrets and guns projecting from them, and give each of these pointers a normal position corresponding exactly with the normal position of the turret producing said indications. As will be seen I have adapted this system to more than two adjacent turrets, the number being capable of indefinite extension.

I show and describe both a two-turret system and a three-turret system. These may, as desired, be used upon separate vessels or upon the same vessel, depending upon the number of turrets employed. Where the two systems are used upon the same vessel— usually a battleship—they are entirely separate. That is to say, two of the turrets of one group are in mutual communication and the three turrets of the other group are so arranged that the middle turret of the group communicates mutually with each of the other two turrets of the same group, but the two turrets last mentioned have no communication with each other, or with either turret of the two turret-group. This arrangement of the groups and relative communication of the turrets thereof is in conformity with the customary positioning and adaptability for use of turrets as employed in practice.

In the accompanying drawings I show a specific embodiment of my invention.

Figure 1 is a diagrammatic illustration of the system applied to two adjacent turrets. Fig. 2 is a central transverse section of one of the combined receiving instruments which I use. Fig. 3 is another section through the same, with the front dials and cover removed. Fig. 4 is a plan view of the same with the cover and dials in place. Fig. 5 is a front elevation of a transmitter with the front cover removed to show the inside parts. Fig. 6 is a transverse sectional elevation of the same, showing a connection box attached thereto. Fig. 7 is a sectional elevation of a turret and a barbette, showing the manner of connection of the combined indicating instrument; Fig. 8 is a diagrammatic illustration of the system applied to three adjacent turrets, and Fig. 9 is a plan view with parts broken away showing a combinational receiver for the central turret of the three turret system.

While the wiring of the three-turret system is more elaborate than that of the two-turret system, I find it convenient to use in both systems a single form of electrical transmitting switch, hereinafter called an electrical transmitter, and shown more particularly in Figs. 5 and 6. The contact mechanism of this switch is adapted for either system by merely connecting all of it up for the three-turret system, or leaving portions of it disconnected and therefore idle if the two-turret system is the one to be used, and making slight changes in the relative positions of various contact sectors.

I will first describe the two-turret system, shown in Fig. 1.

The instruments at A, at the right of the figure, are located in one turret, while the instruments A' on the left hand side of the diagram are those in an adjacent turret. An electric transmitter $t$ in turret A is connected by conductors $c$ to a receiver $r'$ in turret A'. A like transmitter $t'$ in turret A' is connected by wires with a receiver $r$ in turret A. The transmitters are in the form of rotary switches suitably geared to the turret or to the barbette. In Fig. 7 a gear connection is shown from a transmitter $t$ to a rack $k$ on the barbette of a turret. With the parts thus arranged, when the turret is rotated its rotary switch is given an angular movement directly proportional to the angular movement of the turret.

The receivers are in the form of step by step motors which are provided with movable pointers. As here shown, the motors of the receivers each consist of fifteen field magnets, $g'$, $h'$, $e'$ one terminal of each magnet being connected to one of the conductors $c$, $c'$, $c''$ while the other terminal is connected to an omnibus ring $n$.

The contacts of the transmitters are so arranged with respect to each other, and are of such an extent, that they energize the magnets of the motors three at a time, one at one end of a diameter and two at the other end, to give the armature $a$ of the motor thirty definite positions as hereinafter described. Power is supplied to these instruments from a suitable source S. Located in each turret and so connected as to be moved by the turret in the same manner as are the rotary transmitters (see Fig. 7) is a mechanical transmitter $m$. In Fig. 1 are two of these mechanical indicators, designated M and M' respectively, and actuated by two shafts which connect them respectively with the centers of the mechanical switches. These shafts are shown in full lines as broken away, and in dotted lines as leading to the transmitters.

The mechanical and electrical receivers $r$ and M, and $r'$ and M', I have for convenience combined into a single instrument in order to secure adaptability of use and accuracy of indications. The combined instrument of this embodiment I have shown in Figs. 2, 3 and 4. The main casing of the instrument is shown at 10, $m'$ being its mechanical construction and $r$ the electrical mechanism. A cover member 12 secured to the casing 11 by screws 13 carries two beveled glass dials 14 secured in place by plates 15 on the underside of the cover. The operating shaft for the mechanical indicator is designated 16 and extends through a bearing 17, and carries a bevel gear 18. Meshing with this bevel gear is a second bevel gear 19 which is mounted on a short vertical shaft or spindle 20, journaled in bearings 21 and 22 of a bracket 23, and also journaled in a bearing 24 in a wide bracket 25 straddling the space above the bracket 23. This bracket is secured at its opposite ends to a shelf 26 at one end of the casing, and a frame about the middle of the casing. At its upper end, the shaft 20 is provided with a pointer 27 shaped, as shown in Fig. 4, approximately in the same form as the turret in which it is mounted, and its guns. A suitable scale is graved upon the beveled glass 14, or upon the plates 28 beneath it and over which the pointer moves, and the point of the pointer is sharpened for accurate indication on the scale. Thus the pointer is given an angular movement directly proportional to the angular movement of the turret, and if the pointer is set in the proper normal position with respect to the normal position of the turret, accurate indications of the angular position of the turret are given by the pointer as it is moved over the scale.

The electrical receiver or indicator within the casing comprises a field frame 29 on which are fifteen magnets projecting radially inward as shown in Fig. 3, they being tied together at their inner ends by a band of metal 30. It is this frame 29 on which the inner end of the bracket 25 rests, the frame 29 being provided with an overhanging inwardly extending portion 31. A bracket 32 of similar size and shape to the bracket 25 straddles this frame portion 31 and is secured thereto by suitable screws. Journaled in this bracket and in the bottom of the casing in a bearing plate 33 is a spindle 34, which carries the armature $a$ of the motor. Between the bracket 32 and the armature on the spindle 34 are two slip rings 35 and 36 insulated from each other and from the spindle. Spiral springs 37 secured one to each of these rings lead in opposite directions to two binding posts 38, to which connections are made from a source of power for energizing the armature $a$. Disks of insulating material 39, carried by the spindle, separate the springs from each other in order that short circuits at this point may be prevented. A pinion 40 on this spindle meshes with a pinion 41 on a short spindle 42, the latter being journaled in bracket 32 and an arm 43 secured to the under side thereof. The spindle 42 projects above the bracket 32, and carries an indicating pointer 44 similar in all respects to the pointer 27, as shown in Figs. 2 and 4. This pointer 44 is arranged to bear the same angular relation to the adjacent turret as that of the pointer 27 to the position of the turret in which the indicator is located. Connections are made by cable from the transmitter in the other turret to panels 46 located on opposite sides of the spindle 20 of the mechanical indicator, and in the space below the bracket 25. From these panels a number of leads are run to the respective magnets of the motor of the receiver.

The transmitter shown in Figs. 5 and 6 comprises a casing 47, substantially cylindrical in shape, and in which is mounted concentrically a cylindrical supporting member 48 of insulating material, which carries on its inner surface, and embedded therein, metallic segmental contact strips. Journaled in this casing is a transverse shaft 50, which carries a contact arm 52 adjustably mounted thereon. This contact arm carries a number of brushes, in this instance twelve, and designated as 49, $49^a$, $49^b$, $49^c$, $49^d$, $49^e$, $49^f$, $49^g$, $49^h$, $49^k$, $49^l$, and $49^m$. These twelve brushes each engage one of the heretofore mentioned metallic segmental contact strips or stationary rings, each made up of one or more sectors, shown diagrammatically in the lower middle portion of Fig. 8, and designated respectively as $t^2$, $t^4$, $t^5$, $t^6$, $t^7$, $t^8$, $t^9$, $t^{10}$, $t^{11}$, $t^{12}$, $t^{13}$, and $t^{14}$. The brushes and sectors are all used when the transmitter is employed in the middle turret of the three-turret system, as indicated in Fig. 8, but not when the transmitter is located in any other turret. That is to say, when the transmitter is used in any turret except the middle turret of the three-turret system the brushes $49^g$, $49^h$, $49^k$, $49^l$, and $49^m$, and the rings made up of sectors $t^{10}$, $t^{11}$, $t^{12}$, $t^{13}$ and $t^{14}$ are simply left disconnected from all wiring and thus left altogether idle. For this reason they are omitted from Fig. 1, and also from the right and left of Fig. 8. The brushes 49, $49^a$, $49^b$, $49^c$, $49^g$ and $49^h$ are metallically connected together and may therefore be considered for some purposes as a single brush. Similarly the brushes $49^d$, $49^e$ and $49^f$ are connected with each other, as also are the brushes $49^k$, $49^l$ and $49^m$. There are thus three distinct groups of brushes separated by annular members 53, 54 of insulating material.

Binding posts 55 are connected with the various sectors, and are used or not as occasion requires, depending upon whether the particular sectors are to be connected or not, as above described, with the wiring.

A panel connection box is sweated to the bottom of the cylindrical casing, and a pair of conduits 57, for cables, lead to this box. Leads from the several panels extend to the binding posts. A cover 58, making a water-tight joint within the casing, is readily removed for the purpose of attaching and detaching connections, as well as for adjusting the contact arm 52.

The contact arm 52 of each electrical transmitter has a rotary or angular movement corresponding to that of the turret in which it is located and whereby it is actuated, in like manner as the indicating pointer of the mechanical receiver located in, and actuated by, the same turret. The range of movement is in each case the same, and is preferably 290 degrees; that is, 145 degrees each way from a normal position, as may be understood from Figs. 1 and 4. This range of movement approximates the angular range usually allowed for turning a turret. The armature of the electrically operated receiver has however a slightly wider range of movement, and can describe a complete circle, but the gearing between each armature shaft and the indicating pointer 44 associated with it (see Fig. 2) is so arranged as to compensate for the difference in angular travel. Therefore, regardless of the extent of rotation of the armature, the indicating pointer of the electrical receiver has an angular travel coinciding exactly with that of the turret controlling it, as above stated. Rotation of a turret has, therefore, two effects. In actuating the mechanical transmitter, it causes the mechanical receiver, located in the same turret, to indicate to the operator the position of his own turret relatively to the center line of the ship. In actuating the electric transmitter of this turret, so as to cause the contact arm of the electric transmitter of the same turret to turn angularly, the electric receiver of the mating turret is energized, and makes an indication showing the angular position of the actuating turret.

The wiring and various electrical connections of the two-turret system are shown diagrammatically in Fig. 1. As most of the wires and contact sectors here shown are practically duplicated, I will describe in detail only a sufficient number of them to render clear the operation of the system in question. The right-hand portion of Fig. 1 represents the electrical equipment of one turret, the left-hand portion representing that of the mating turret of the same system. For convenience I designate these two turrets as turret A and turret A'.

The stationary contact members, or sectors, of the two electric transmitters $t$, $t'$ are alike for both of these transmitters. The various sectors are stationary and as a rule insulated from each other. They are grouped into the proximate form of mutilated rings, the diameters of which are equal, as indicated in Fig. 6. The apparent differences in the diameters of these rings, as illustrated in Fig. 1, are adopted merely for convenience in indicating diagrammatically the various relative positions of the sectors.

Two sectors $t^2$ are connected together by a short wire $t^3$, and constitute a contact member which for convenience I designate as the positive ring. It is located near the middle of the casing, according to Fig. 6. Next to the positive ring is a sector $t^4$, made in a single piece but otherwise having a form similar to that of the positive ring. Next are a large number of comparatively short sectors $t^5$, $t^6$, $t^7$, and $t^8$ grouped into the form of a number of mutilated rings. The last ring is made of two sectors $t^9$, connected by a wire $t^{20}$, and conveniently designated as the negative ring. A wire $t^{21}$ extends from one of the sectors $t^5$ to one of the adjacent sectors $t^6$, and a wire $t^{22}$ similarly extends from one of the sectors $t^7$ to one of the sectors $t^8$.

The various wires $c$, $c'$, $c''$ and others of the same series are severally in connection with each of two sectors. For instance the two wires $c''$ are connected with two wires $v$, $w$, the latter leading, respectively, to two of the sectors $t^8$, $t^7$. The two wires $c''$ are also in metallic communication with two of the sectors $t^5$, $t^6$, as will be understood from Fig. 1.

The dynamo S, located upon any convenient part of the ship, is used for supplying current for the system. A pair of bus bars, positive and negative, are connected with this dynamo, and with a two-blade hand switch S'. A wire $S^2$ leads from the left blade of the switch to the positive ring. A wire $S^3$ is connected with the negative ring, and with a wire $S^4$, the latter being also connected with the armature winding $r^2$ of the electric receiver in the turret A'. The wires $S^3$ and $S^4$ thus together extend from the transmitter in one turret to the receiver in another. A return wire $S^6$ extends from the junction of wires $S^3$ and $S^4$ to the right blade of switch S'. Another wire $S^5$ is connected with the armature winding $r^2$, and extends therefrom to the turret A at the right, and is there connected to the sector $t^4$ of the transmitter $t$.

The operation of the system shown in Fig. 1 is as follows: The turret A, located at the right side of the figure, is turned for the purpose of training the gun or guns located within it. As elsewhere explained, this rotation of the turret in question actuates the mechanical transmitter, and the latter actuates the mechanical receiver or indicator in the same turret, so that the operator thereof is apprised of the position of his own turret, relatively to the center line of the ship. The rotation of the turret in question also causes the contact arm 52 of the electrical transmitter of this turret to turn or swing angularly upon its axis of rotation and to assume, I will say, the position indicated at the right of the figure. Two circuits, one of which I designate as an armature circuit and the other as a field circuit, are thus completed. The armature circuit is practically always closed, and is in part identical with the field circuit, but for the sake of clearness I will trace these circuits separately. The armature circuit is as follows: dynamo S, positive bus bar, left blade of switch $S^1$, wire $S^2$, positive ring (sectors $t^2$) of transmitter $t$ in turret A, brushes 49, 49$^a$, (see Fig. 6) sector $t^4$, wire $S^5$ to armature winding $r^2$ of turret A', wire $S^4$, wire $S^6$, right blade of switch $S^1$, thence through negative bus bar back to dynamo S. This circuit energizes the armature of the electrical indicator in turret A', thus conferring polarity upon said armature. The field circuit of the two-turret system is as follows: dynamo S, positive bus bar, left blade of switch $S^1$, wire $S^2$, next the sector ring $t^2$ of transmitter $t$ (see Fig. 6) in turret A, brushes 49, 49$^b$ carried by switch arm 53, and through these brushes to sector $t^5$, wire $c'$ to field magnet $g'$ of the receiver in turret A', omnibus ring $n$, to field magnets $h'$ and $e'$; here dividing between two wires $c''$, thence following the two wires $v, w$ respectively to two sectors $t^7$, $t^8$, brushes $49^d$, $49^e$, thence uniting in brush $49^f$, next entering negative ring $t^9$ and following wire $S^3$, wire $S^6$, right blade of switch $S^1$, negative bus bar, back to dynamo S. This circuit energizes the field magnets $g'$, $h'$ and $e'$, and causes the revoluble armature to assume the position indicated at the middle left of Fig. 1, so that the indicating pointer controllable by said armature and geared thereto takes up a position coinciding with that of the turret A. If, now, the turret A be turned very slightly, say in a clockwise direction, an appropriate mechanical indication is of course made in the same turret, and the armature circuit above remains unchanged. The slight shifting of the contact arm 52, however, makes a corresponding change in the field circuit so that the latter now includes the field magnets $g'$ $g^2$ and the one designated as $h'$, and the armature turns slightly in a clockwise direction. The movement of the transmitter shaft being continued a little farther, the field circuit is again altered, so as to exclude the magnet $g'$ and to include the magnet $h^2$ next at the left of the magnet $h'$. This process is repeated indefinitely within the limits of travel allowed for the revoluble arm of the transmitter and the armature. The armature is thus rotated step by step, each step being measured by half the distance from the center of one field magnet to the center of the next. First, adjacent to the north-seeking pole of the armature a single field magnet is energized, while adjacent to the south-seeking pole two of the field magnets are together energized, the current flowing through them in parallel; next one of these two magnets is dropped from the circuit and another magnet, near the north-seeking pole of the armature, is picked up, the armature while in action is thus always attracted by three magnets, two of them being at one end of the armature and the third at the opposite end thereof. The steps traveled by the armature are so short that its angular movement may be considered as continuous rather than intermittent, and practically speaking the indicating pointer which it controls through gearing merely makes a simple movement for any number of steps. This is true no matter in which of two directions the rotation may take place.

When turret A' is turned, the mechanical indicator M' and the electric transmitter $t'$ of this turret are actuated, and an approximate indication is made by the receiver $r$ of the turret A, the several circuits thus affected each having its counterpart among the circuits above discussed. In order, therefore, for the operator in either turret to ascertain whether or not his gun or guns may be trained and fired in a particular direction, it is only necessary for him to glance at his own indicators and he has at once accurate information.

In Fig. 8 the application of the system to three adjacent turrets, a center turret and two outside turrets is shown. I designate these turrets as X, Y, Z. In this instance it is not necessary that indications of either of the end turrets should be made in the other end turret, for the reason that the outside turrets are usually such a distance from each other that they may be operated freely, and their guns fired without reference to the positions of the guns in the other turrets. But it is essential that the central turrets be operated with great care as respects each outside turret. According to my invention as used in this instance, there is provided in the central turret two receiving indicators, one connected to a transmitter in one outside turret, and the other similarly connected to a transmitter in the other outside turret.

I find it convenient to combine, in a single indicating instrument shown in Fig. 9, the mechanical indicator of the central turret and the two electrical indicators controllable by the other two turrets. This combinational instrument is installed in the central turret, which I designate as Y. The two outside turrets I designate respectively as X and Z, and in each of them is placed an electric transmitter $t$ and an electric indicator $r$, combined in a single instrument, and also a mechanical transmitter and a mechanical indicator. Each turret X, Z, has therefore an equipment like that of either turret of the two-turret system above described. The transmitter $t$ in turret X communicates with the electric indicator R' in turret Y, this indicator being, except for its combinational structure indicated in Fig. 9, identical with the indicator $r'$ shown in Fig. 1. The transmitter $t'$ in turret Z communicates with an indicator R in turret Y, this indicator, except for its environment, being similar to the indicator $r$ shown in Fig. 1. The transmitter T of turret Y communicates with each of the receivers $r$, $r'$, located respectively in turrets X and Z, these two receivers corresponding in structure to the receivers $r$, $r'$ shown in Fig. 2. The mechanical indicator $M^2$ is disposed in the middle of the casing, as will be understood from Fig. 9, but is otherwise identical in structure with the mechanical indicator above described, and by the rotation of the turret in which it is located is similarly controlled by a mechanical transmitter, also identical in structure and action, with those already described. The equipment of the turret Y therefore differs from that of other turrets mainly in the fact that in turret Y there are two electrical indicators, and that the transmitting switch has all of its sectors connected with the wiring, the number of wires being proportionately greater.

In the turret X, the electric transmitter and indicator are designated respectively as $t$ and $r$. The electric transmitter and the two electric indicators in the turret Y are designated respectively as T, R and R'. The transmitter and receiver in the turret Z appear as $t'$ and $r'$ respectively. The wiring between the transmitter $t$, in the turret X, and the indicator R' in the turret Y, and the wiring between the transmitter $t'$ in the turret Z, and the indicator R, in the turret Y, is closely analogous to the wiring shown in Fig. 1 and above described with reference to the two-turret system. I do not deem it necessary, therefore, to further describe this part of the wiring shown in Fig. 3. Suffice it to say that the transmitter $t$ controls the indicator R', and that the transmitter $t'$ controls the indicator R, in the same manner that the two transmitters of the two-turret system control the corresponding indicators thereof. Since, however, the transmitter T controls two separate indicators $r$ and $r'$, located in separate turrets, and is connected therewith by two separate groups of wires, I will describe these parts more particularly.

A dynamo for supplying power to all of the wiring of the three-turret system is shown at V, and connected with it is a positive bus bar $v^1$ and a negative bus bar $v^2$. Connected with these bus bars is a two-blade switch $v^3$. Leading to the left from the two blades of this switch are two wires $v^4$, $v^5$. A wire $v^6$ is connected to the wire $v^4$ and leads to one of the sectors $t^4$ of the transmitter T in turret Y. A wire $v^7$ is connected with a wire $v^5$ and leads to the sector $t^9$ of said transmitter. A wire $v^8$ is connected with a sector $t^2$ and with the winding $r^2$ of the armature $a$ of the indicator $r'$ in the turret Z. From this winding $r^2$ a wire $v^9$ leads back and is connected with the wire $v^5$. The various magnets $g'$, $h'$, $e'$ of the two indicators $r$ and $r'$ are connected by separate wires with approximate sectors of the transmitter T, substantially in the same manner that the analogous parts are connected in Fig. 1. Other magnets of the indicators $r$, $r'$, are for convenience here designated as $a^1$, $a^2$, and $a^3$. Connected with the magnet $a^1$ of the indicator $r'$ is a wire $v^{10}$, which leads to a sector $t^{11}$. A wire $w$ leads from the magnet $a^2$ of the indicator $r'$ to a sector $t^{12}$ of the transmitter T. A wire $x$, leads from the magnet $a^3$ of the indicator $r'$ to the sector $t^{12}$ of the transmitter T. Connected with the wire $w$, is a wire $w'$, which leads to a sector $t^{10}$. Two other wires $w^2$, $w^3$ are similarly connected with other wires, and with sectors $t^{11}$ and $t^{10}$. Connected with the wire $x$, is a wire $x'$, which leads to one of the sectors $t^{10}$. Other wires $x^2$, $x^3$ are connected in a manner similar to that of the wire $x'$ and lead respectively to two of the sectors $t^{11}$, $t^{10}$. A wire $v^{10}$ is connected with the magnet $a'$ of the indicator $r'$ and also with a wire $v^{11}$, the latter leading to a sector $t^{13}$. Other wires, such as $x^4$, $x^5$, $x^6$, $x^7$, $x^8$, $x^9$, $x^{10}$ and $x^{11}$, connect various sectors with wires leading to magnets of the indicator $r$. A wire $v^{12}$ extends from a sector $t^2$ to the armature $a$ of the indicator $r$, and a wire $v^{13}$ extends from this armature to a wire $v^{14}$, the latter being connected with the wire $v^5$. A number of wires such as $v^{15}$, $v^{16}$, $v^{17}$ are connected respectively with magnets $a^1$, $a^2$, $a^3$ of the indicator $r$, and as shown are in metallic communication with various sectors or with wires leading thereto, as the case may be, of the indicators $r$, $r'$ is connected with some one of the sectors of the transmitter T.

I will now trace some of the circuits for the wiring just described. Assuming that for the moment the transmitter T is in the condition indicated, one circuit is as follows: dynamo V, positive bus bar $v'$, left blade of switch $v^3$, wire $v^4$, wire $v^6$, sector ring $t^4$ of transmitter T, brush $49^n$ (see Fig. 6), brush 49, sector $t^2$, wire $v^8$, armature winding $r^2$ of indicator $r'$, wires $v^9$, $v^5$, right hand blade of switch $v^3$, bus bar $v^2$ back to dynamo V. This circuit energizing the armature $a$ of the indicator $r'$ and confers polarity upon said armature, which remains magnetized at all times while the system is in use. Another circuit may be traced as follows: dynamo V, bus bar $v'$, left blade of switch $v^3$, wires $v^4$, $v^6$, sector $t^4$, brushes $49^a$, $49^b$, a sector $t^{10}$, wires $w^1$, $w$, magnet $a^2$ of indicator $r'$, ring $n$, magnet $a'$, wires $v^{10}$, $v^{11}$, sector $t^{13}$, brush $49^l$, brush $49^m$, sector $t^{14}$, wire $n^3$, wires $v^7$, $v^5$, right hand blade of switch $v^3$, negative bus bar $v^2$ to dynamo V. Another circuit, identical in part with the one just traced, is as follows: dynamo V, bus bar $v'$, left blade of switch $v^3$, wires $v^4$, $v^6$, sector $t^4$, brushes $49^a$, 49, $49^g$, $49^h$, a sector $t^{11}$, connecting wire to a sector $t^{10}$ (not now engaged by a brush) wires $x'$, $x$, magnet $a^3$, ring $n$, magnet $a'$, wires $v^{10}$, $v^{11}$, sector $t^{13}$, brush $49^l$, brush $49^m$, sector $t^{14}$, wire $n^3$, wires $v^7$, $v^5$, right hand blade of switch $v^3$, negative bus bar $v^2$ to dynamo V. These two circuits just traced energize the magnets $a'$, $a^2$ and $a^3$, and cause the armature $a$ of the indicator $r'$ to assume the position shown. If the revoluble member of the transmitter T be turned in either of two directions, the circuits are affected, and the armature turns in a direction corresponding to the movement of the revoluble member of the switch T. A circuit affecting the armature of the indicator $r$ may be traced as follows: dynamo V, bus bar $v'$, left hand blade of switch $v^3$, wires $v^4$, $v^6$, sector $t^4$, wire $v^{12}$, armature winding $r^2$ of indicator $r$, wires $v^{13}$, $v^{14}$, part of wire $v^5$, right hand blade of switch $v^3$, bus bar $v^2$ to dynamo V. This circuit keeps the armature $a$ magnetized. Another circuit affecting the indicator $r$ is as follows: dynamo V, bus bar $v'$, left blade of switch $v^3$, wires $v^4$, $v^6$, sector $t^4$, brushes $49^a$, $49^b$, $49^c$, a sector $t^6$, wire $v^{16}$, magnet $a^2$ of receiver $r$, ring $n$, magnet $a'$, wire $v^{15}$, a sector $t^7$, brushes $49^d$, $49^e$, $49^f$, sector $t^9$, wires $v^7$, $v^5$, right blade of switch $v^3$, bus bar $v^2$ to dynamo V. Another circuit of the same series, identical in part with the one just mentioned, may be traced as follows: dynamo V, bus bar $v'$, left blade of switch $v^3$, wires $v^4$, $v^6$, sector $t^4$, brushes $49^a$, $49^b$, a sector $t^5$ through short connecting wire to a sector $t^6$ (not now engaged by a brush) wire $v^{17}$, magnet $a^3$ of receiver $r$, ring $n$, magnet $a'$, wire $v^{15}$, a sector $t^7$, brushes $49^d$, $49^e$, $49^f$, a sector $t^9$, wires $v^7$, $v^5$, right blade of switch $v^3$, bus bar $v^2$ to dynamo V.

If now, the revoluble contact arm of the transmitter T be turned in either of two directions from the position indicated in Fig. 8 the circuits through the indicator $r$ are changed accordingly, and the armature $a$ of this indicator is turned in the same direction, and to the same extent, as the contact arm of the transmitter T.

As thus organized the "three-turret" system will operate as satisfactorily as the "two-turret" system, the principle of operation being substantially the same, for all that the system as organized is somewhat different. It should be evident from this and other considerations that this system may be applied to more turrets than three. In fact, my invention may be given many modified forms, without departing in any wise from its generic spirit, and I therefore desire to cover in the annexed claims all such modifications which fall within its scope.

What I claim is:

1. A turret tell-tale system comprising three turrets, a single transmitter in each turret operated by movement of the turret, two receivers in one turret, one receiver in each of the other two turrets, connections from the transmitter of the turret having two receivers to the receiver in each other turret, and connections from the transmitter of each turret having one receiver to a separate one of the two receivers in the one turret.

2. A turret tell-tale system comprising three turrets, one central turret and two outside turrets, a single transmitter in each turret operated by movement of the turret, two receivers in the central turret, one receiver in each of the outside turrets, connections from the transmitter of the central turret to the receiver of each outside turret, and connections from the transmitter of each outside turret to one of the receivers of the central turret.

3. A turret tell-tale system comprising three turrets, one central turret and two outside turrets, a single transmitter operated by change of position of the turret in each turret, two position indicators in the central turret, one position indicator in each of the two outside turrets, connections from the transmitter of the central turret to the position indicator of each outside turret, and connections from the transmitter of each outside turret to a position indicator of the central turret.

4. A turret tell-tale system comprising three turrets, one central turret and two outside turrets, a single transmitter in each turret operated by movement of the turret, two receivers in the center turret, one receiver in each of the outside turrets, connections from the transmitter in the central turret to the receiver in each outside turret, connections from the transmitters in the outside turrets each to a receiver in the central turret, and means associated with the receivers of the central turret for indicating the position of the central turret.

5. A turret tell-tale system for three turrets comprising one central turret and two outside turrets, a transmitter in each turret operated by movement of the turret, two receivers in the central turret, one receiver in each of the outside turrets, connections from the transmitter of the central turret to the receiver of each outside turret, connections from the transmitter of each outside turret to the receiver of the central turret, and means associated with the receivers of the central turret and operated by the central turret, for indicating the position of that turret.

6. A turret tell-tale system comprising three turrets, a transmitter in each turret operated by movement of the turret, two receivers in one turret, one receiver in each of the other two turrets, connections from the transmitter of the turret having two receivers to the receiver in each other turret, connections from the transmitter of one of the turrets having one receiver to the receiver in the one turret having two receivers, connections from the transmitter of the other turret having one receiver to the other receiver of the turret having two receivers, and means associated with each turret and with the receivers thereof for indicating the position of the turret.

7. A turret tell-tale system comprising three turrets, a transmitter in each turret operated by movement of the turret, two receivers in one turret, one receiver in each of the other two turrets, connections from the transmitter of the turret having two receivers to the receiver in each other turret, connections from the transmitter of each of the turrets having one receiver to a separate receiver in the one turret having two receivers, and a mechanical indicator associated with each turret and the receivers thereof for indicating the position of that turret with respect to the other.

8. A turret tell-tale system comprising two turrets, a position indicator in each turret operated by its turret, a second position indicator in each turret, a transmitter in each turret synchronously movable with its containing turret, operating means between the turret and the transmitter, and independent connections between each transmitter and the second position indicator in the other turret, each of said transmitters alone controlling its connected indicator.

9. A turret tell-tale system comprising two turrets, a position indicator in each turret, a transmitter operated by movement of the turret in each turret, independent connections between each transmitter and the position indicator in the other turret, and means in each turret operated by movement of the turret and associated with the receiver in the turret for indicating the position of that turret.

10. A turret tell-tale comprising two turrets, two position indicators in each turret, one each of said indicators operated mechanically by the movement of its containing turret for self-indication and the other operated electrically, a transmitter in each turret actuated positively by the movement of the turret for electrically operating the second indicator in the other turret, each of said electrical indicators including a motor, and each transmitter comprising a switch movable in unison with its containing turret and means connecting the turret and switch to move the latter positively as the turret moves and cause the motor to take definite positions corresponding to definite positions of the turret containing the transmitter.

In testimony whereof I have hereunto set my hand in presence of two subscribing witnesses.

FRANK W. WOOD.

Witnesses:
SAUL W. LEVY,
JOSEPH SUTTON.